(12) United States Patent
Baumann et al.

(10) Patent No.: US 6,647,941 B2
(45) Date of Patent: Nov. 18, 2003

(54) AIR-ROUTING SYSTEM, ESPECIALLY A SUCTION SYSTEM OF AN INTERNAL COMBUSTION ENGINE

(75) Inventors: Christof Baumann, Moeglingen (DE); Werner Blossey, Benningen (DE); Hans-Peter Hielscher, Steinheim (DE); Thomas Jessberger, Rutesheim (DE); Herbert Pietrowski, Pleidelsheim (DE); Achim Rehmann, Kieselbronn (DE); Hans-Peter Scholl, Mundelsheim (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/191,441

(22) Filed: Jul. 10, 2002

(65) Prior Publication Data

US 2002/0174847 A1 Nov. 28, 2002

Related U.S. Application Data

(62) Division of application No. 09/807,072, filed as application No. PCT/EP99/06894 on Sep. 17, 1999, now Pat. No. 6,474,284.

(30) Foreign Application Priority Data

Oct. 8, 1998 (DE) .......................................... 198 46 281

(51) Int. Cl.[7] ............................................. F02M 35/10
(52) U.S. Cl. ................................ 123/184.47; 123/184.58
(58) Field of Search ....................... 123/184.21, 184.34, 123/184.42, 184.47, 184.58

(56) References Cited

U.S. PATENT DOCUMENTS

| 4,765,285 | A | 8/1988 | Kobayashi |
| 5,657,727 | A | 8/1997 | Uchida |
| 5,950,586 | A | 9/1999 | Ropertz |
| 6,024,066 | A | 2/2000 | Nakayama et al. |
| 6,089,202 | A | 7/2000 | Nomura et al. |
| 6,098,586 | A | 8/2000 | Bloomer |
| 6,192,849 | B1 | 2/2001 | Powell |

*Primary Examiner*—Noah P. Kamen
(74) *Attorney, Agent, or Firm*—Crowell & Moring LLP

(57) ABSTRACT

An air routing system includes an air filter for cleaning intake air having a clean air outlet a compressor for compressing aspirated intake air an intermediate line connected between the clean air outlet of the filter and the compressor, and an intake module. The intake module includes a plenum with a clean air inlet for compressed intake air at least one intake pope connected to the plenum and a bypass line for excess compressed filtered air. The bypass line has an inlet to a channel segment of the intake module for uncompressed clean air upstream of the compressor, and the bypass line is at least partly integrated into the intake module such that a volume of the bypass line at least partly surrounds the plenum.

4 Claims, 2 Drawing Sheets

AIR-ROUTING SYSTEM, ESPECIALLY A SUCTION SYSTEM OF AN INTERNAL COMBUSTION ENGINE

CROSS REFERENCE TO RELATED APPLICATIONS

Figure 1:
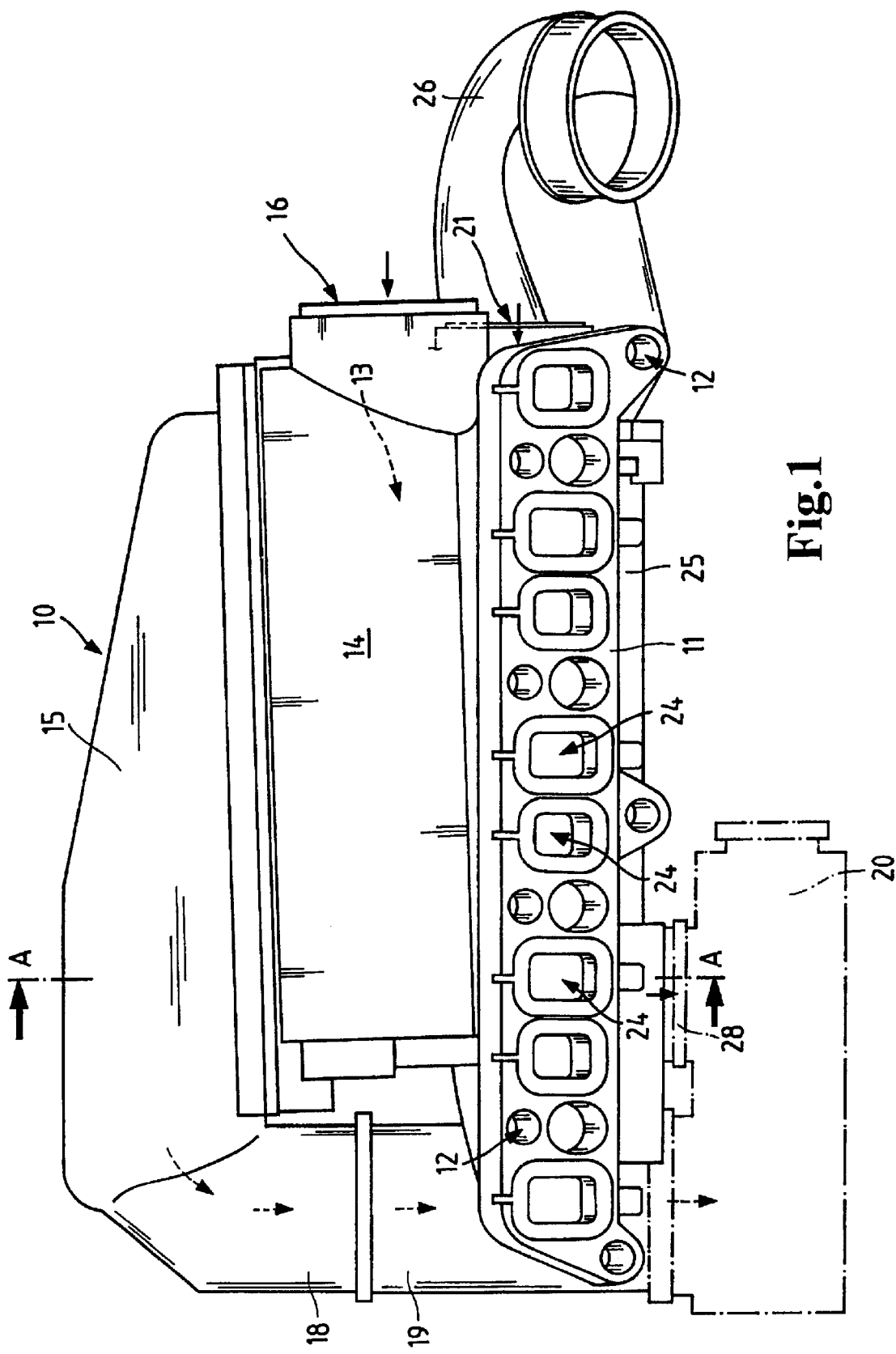

The present application is a division of patent application Ser. No. 09/807,072, filed Jul. 10, 2001, now U.S. Pat. No. 6,474,284, is a 371 of PCT/EP99/06894 filing date Sep. 17, 1999 the entire disclosure of which is incorporated herein by reference. Priority is claimed based on Federal Republic of Germany Patent Application No. 198 46 281.6, filed Oct. 8, 1998.

STATE OF THE ART

The invention relates to an air routing system, particularly an intake system of an internal combustion engine. The invention further relates to an intake module, particularly an intake module of an internal combustion engine.

Air routing systems for use as an intake tract for internal combustion engines are known, for example, from EP 0664390. This document notably describes the integration of the air filter housing and the intake pipe in a single cast part. Further components, such as an air/oil separator for the crankcase gases, may also be integrated into the intake module thus created. These measures are also particularly suitable for the design of plastic intake pipes produced by means of multishell technology.

The increasing requirements for engine output and driving comfort, however, result in increasingly tighter space conditions in the engine compartment, e.g., due to the increasing number of engine components. Consequently, the air intake system for the engine must also have a more compact design. On the other hand, certain minimum volumes are required to produce the necessary acoustic properties of the intake system.

Known technical solutions suggest approaches to component integration in view of the reduced overall space. But these can be further improved.

The object of the invention is to provide an air intake system, particularly for internal combustion engines, which optimally uses the available space and thereby creates additional volumes that can serve to enhance the behavior of the intake system with respect to its flow characteristics and its acoustics. This object is attained by the present invention as described hereinafter.

ADVANTAGES OF THE INVENTION

The air routing system according to the invention is provided particularly for engines that are charged by compressors and have an air bypass to compensate the compressor overpressure in the high-speed range of the engine. This bypass line supplies the excess combustion air back to the filtered air pipe behind the air filter in front of the compressor. According to the invention, said bypass line is integrated into the lower shell of the intake module. In contrast to a hose assembly with round cross section, which might alternatively be considered, this solution does not create a dead space. Thus, the available clearance is optimally utilized. Furthermore, this measure clearly reduces the complexity of the final assembly of the vehicle since replacing the hose with the integrated channel eliminates a component that is difficult to handle. An additional advantage is a reduction of the total weight of the intake system.

A special embodiment of the bypass line provides that it be arranged around the intake air plenum. This achieves not only a component integration but also a functional integration. The volume of the bypass line in this embodiment additionally acts as sound insulation.

A further modification of the bypass line provides that the connection of the bypass line to the compressor be made of an elastic molded part.

This part can be optimally adapted to the available clearance and thus facilitates assembly.

A further embodiment of the invention provides for a resonant cavity in the intermediate line between filter and compressor into which the bypass line simultaneously opens. This, too, is a functional integration measure. The air supply line may simultaneously be used to optimize the intake housing acoustically.

Another approach according to the invention for optimizing the space of the air intake system provides for a hood on the air filter housing, which together with the intake pipe forms the core part of the intake module. This hood should be capable of being mounted quickly, which is advantageously ensured by a snap on connection. The mounted hood uses a clearance that must be provided for the assembly tools of the intake pipe or other components in the engine compartment. Assembly of the intake pipe or the other engine components is thus affected with the hood removed, which can subsequently be mounted again.

According to one embodiment of the inventive concept of the filter housing with hood, the air volume available within the filter housing is enlarged. This has a positive effect on the noise at the mouth of the intake pipe, since the additional volume acts as a damper. Furthermore, the distribution of the air over the filter element is improved. This increases the filter's service life.

According to a further embodiment of the invention the unfiltered-air-side inlet of the filter housing is provided within the hood. This measure makes it possible to combine the hood with the air intake of the intake system into a preassembled unit. In this way it is possible to further optimize the assembly of the engine.

These and other features of preferred further embodiments of the invention are set forth in the claims as well as in the description and the drawings. The individual features may be implemented either alone or in combination in the embodiment of the invention or in other fields of application and may represent advantageous embodiments that are protectable per se, for which protection is hereby claimed.

DRAWING

Figure 2:
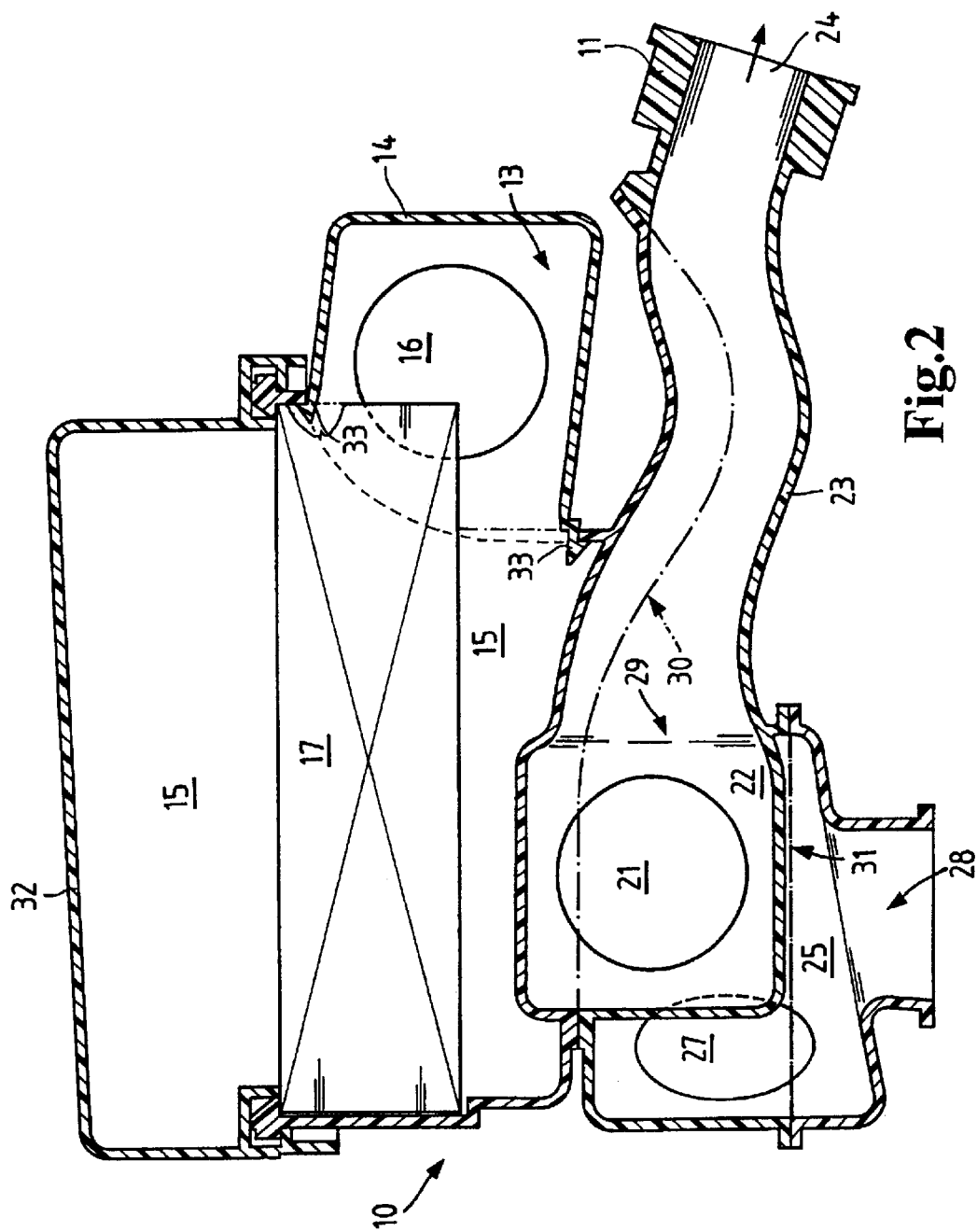

An embodiment of the invention will now be described, by way of example, with reference to the drawings in which:

FIG. 1 shows a side elevation of the intake module as seen from the direction of the cylinder head, and FIG. 2 shows the section along line A—A according to FIG. 1 through the intake module along one of the intake pipes.

DESCRIPTION OF THE EMBODIMENTS

FIG. 1 is a side view of an air intake module 10. To mount the intake module, a mounting flange 11 is provided having bores as seats 12 for mounting the intake module by means of bolts to a cylinder head (not depicted). To mount the intake module, it is therefore necessary to provide a clearance 13 obliquely above the mounting flange 11 so that the fastening bolts are accessible with mounting tools. After assembly, however, this clearance is no longer required. During operation of the vehicle, it is an unused volume in the engine compartment. This is why a hood 14 is provided on the intake module 10, which enlarges the air intake volume of an air filter housing 15 in that it uses this clearance 13. Prior to mounting the hood, the clearance is available, however, for the assembly tools. After assembly of the intake module, the hood may simply be replaced.

The path of the intake air through the intake module is shown in FIGS. 1 and 2. The intake air reaches the system through an unfiltered air inlet 16. This air inlet is integrated into hood 14. The air is sucked through a filter element 17 and leaves the air filter housing 15 through a filtered air outlet 18 which ends in an intermediate line 19. The intermediate line opens into a resonance volume 20, which is the connecting element to a compressor (not shown).

The compressed intake air coming from the compressor passes through a filtered air inlet 21 to reach the intake module. The filtered air inlet opens into a plenum 22 from which the individual suction pipes 23 branch off. The suction pipes end in suction pipe outlets 24 in the mounting flange 11, through which the intake air leaves the intake module and reaches the cylinders.

In higher speed ranges, the charging pressure generated by the compressor is too high for the intake air. This pressure is reduced in that the excess compressed air is returned via a bypass line 25 to the filtered air in front of the compressor. The bypass air is supplied to the intake module via a molded part 26 through a return air inlet 27. The air flows through the bypass line 25 and leaves it through an inlet 28, which leads to the resonance volume 20. Here, the air is mixed with filtered air from the intermediate line 19 and then passes again through the compressor.

Toward the top, the plenum 22 adjoins the volume of the filter housing. Toward the bottom and the side facing away from the intake pipe inlets 29, the plenum 22 is surrounded by the volume of the bypass channel 25. The integration of the bypass line into the intake module thus results in a nearly complete encapsulation of the intake air plenum. This has positive effects on the acoustic characteristics of the intake module. The intake module is preferably made of plastic. The basic body may be produced by means of multishell technology. A parting line 30 extends through the plenum as well as through the intake pipes of the intake module. An additional parting line 31 is required in the bypass line. The intake pipe shells are joined, for instance, by vibration welding. The filter housing 15 furthermore has a cover 32, which can be removed to install the filter element. The hood 14 may be mounted to the intake module, for instance, by snap on connections 33.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed:

1. An air routing system comprising:
   an air filter for cleaning intake air having a clean air outlet;
   a compressor for compressing aspirated intake air;
   an intermediate line connected between the clean air outlet of the filter and the compressor, and
   an intake module;
   wherein said intake module comprises:
   a plenum with a clean air inlet for compressed intake air;
   at least one intake pipe connected to the plenum; and
   a bypass line for excess compressed filtered air, said bypass line having an inlet to a channel segment of said intake module for uncompressed clean air upstream of the compressor, and said bypass line being at least partly integrated into the intake module such that a volume of the bypass line at least partly surrounds the plenum.

2. An air routing system according to claim 1, wherein the bypass line is connected to the compressor by an elastic molded part.

3. An air routing system according to claim 1, wherein the intermediate line has a resonance volume into which the inlet for the bypass air opens.

4. An air routing system according to claim 1, wherein said routing system is an air intake system for an internal combustion engine.

\* \* \* \* \*